United States Patent [19]

Balk

[11] Patent Number: 5,017,323
[45] Date of Patent: May 21, 1991

[54] METHOD AND APPARATUS FOR STRETCHING THERMOPLASTIC FILMS

[75] Inventor: Hermann Balk, Troisdorf, Fed. Rep. of Germany

[73] Assignee: Reifenhauser GmbH & Co. Maschinenfabrik, Troisdorf, Fed. Rep. of Germany

[21] Appl. No.: 392,220

[22] Filed: Aug. 10, 1989

Related U.S. Application Data

[63] Continuation-in-part of Ser. No. 201,380, May 25, 1988, abandoned, which is a continuation of Ser. No. 824,624, Jan. 31, 1986, abandoned.

[30] Foreign Application Priority Data

Jan. 31, 1985 [DE] Fed. Rep. of Germany ....... 3503249

[51] Int. Cl.$^5$ .............................................. B29C 55/06
[52] U.S. Cl. ...................... 264/288.4; 26/106
[58] Field of Search ............. 264/288.4, 290.2, 290.7; 26/71, 106

[56] References Cited

U.S. PATENT DOCUMENTS 3,257,490  6/1966  Hovermale et al. ............. 264/290.2
3,351,697  11/1967  Hufnagel et al. .................... 425/66

FOREIGN PATENT DOCUMENTS 0000639  2/1979  European Pat. Off. ......... 264/288.4

Primary Examiner—James Lowe
Attorney, Agent, or Firm—Herbert Dubno; Andrew Wilford

[57] ABSTRACT

A method of and apparatus for continuously stretching a thermoplastic web comprises the steps of feeding the thermoplastic web longitudinally to a heating chamber at a relatively low input speed, engaging the thermoplastic web in the heating chamber with a first member with a relatively low sliding friction between the web and the first member and engaging the thermoplastic web in the heating chamber with a second member spaced longitudinally downstream from the first roller with a relatively high sliding friction between the web and the second member. The thermoplastic web is pulled off the second member in a downstream stretch of the web at a relatively high stretching speed and the web is heated in the chamber to a temperature sufficient to substantially prevent plastic-deformation stretching of the web upstream of the second member.

2 Claims, 1 Drawing Sheet

METHOD AND APPARATUS FOR STRETCHING THERMOPLASTIC FILMS

CROSS-REFERENCE TO RELATED APPLICATIONS

This application is a continuation-in-part of copending patent application Ser. No. 824,624 filed Jan. 31, 1986, and refiled May 25, 1988, as file-wrapper-continuation application Ser. No. 201,380 (both now abandoned).

FIELD OF THE INVENTION

The present invention relates to a method of and apparatus for stretching a thermoplastic film. More particularly this invention concerns the high-speed mass-production of such a film.

BACKGROUND OF THE INVENTION

In the usual process for continuously stretching a thermoplastic band, strip, web, foil, or film the web to be stretched is fed into the stretching apparatus at a predetermined relatively low input speed. In the apparatus it is heated sufficiently to soften it somewhat, and it is displaced out the outlet side at a relatively high outlet or stretching speed. The resultant tension in the web combined with the softening of this web causes it to stretch longitudinally and improves many characteristics of the web, for instance its strength, gloss, and transparency.

The web stretches in the stretching apparatus downstream from a so-called stretch point which is that region in the web where the resistance to plastic (not elastic) deformation is first less than the tension in the web. Thus the location of this stretch point is determined by many rheological factors including but not limited to the type of resin, temperature of the web, and tension in the web, which last-named effect is largely a function in turn of the difference between the input and output speeds.

With the known systems, therefore, this stretch point wanders considerably while the actual stretch imparted to the goods will in fact be determined wholly by the difference between the input and output speeds and will not change even when the stretch point moves. Thus this amount of stretch will be imparted to the web over a short or long distance, depending on whether the stretch point is further upstream or downstream relative to the longitudinal advance direction of the web.

Such a wandering stretch point produces a finished workpiece of varying physical characteristics as some parts of the web might be heated to the softening point more rapidly than others and some parts might be subjected to stretching for longer or shorter times. When the stretch is imparted over a too short distance the thickness, transparency, and other characteristics of the web may be affected adversely, and the web in fact may be torn. When stretching takes place over a too long distance the same and other characteristics may also be deleteriously affected.

OBJECTS OF THE INVENTION

It is therefore an object of the present invention to provide an improved method of and apparatus for stretching a thermoplastic web.

Another object is the provision of such an improved method of and apparatus for stretching a thermoplastic web which overcomes the above-given disadvantages, that is which produces a web or film of very uniform characteristics by controlling the position of the stretch point.

SUMMARY OF THE INVENTION

A method of continuously stretching a thermoplastic web comprises the steps of feeding the thermoplastic web longitudinally to a heating chamber at a relatively low input speed, engaging the thermoplastic web in the heating chamber with a first member with a relatively low sliding friction between the web and the first member and engaging the thermoplastic web in the heating chamber with a second member spaced longitudinally downstream from the first roller with a relatively high sliding friction between the web and the second member. The thermoplastic web is pulled off the second member in a downstream stretch of the web at a relatively high stretching speed and the web is heated in the chamber to a temperature sufficient to substantially prevent plastic-deformation stretching of the web upstream of the second member.

Thus with this system the web is heated to above its softening point while it passes in the chamber in a non-straight sinusoidal path, but as it is heated it is not subjected to any significant tension. Only when the web is heated completely is the system set up to apply any tension to it, so that perfectly uniform stretching will take place over a nonchanging distance.

According to this invention the web is passed in the downstream stretch alternately over and under a multiplicity of stretching rollers in the chamber downstream of the second member. These stretching rollers can also be provided outside the heating chamber.

In accordance with this invention movement of the film is impeded by making the downstream member nonrotatable and providing a relatively great coefficient of friction between the downstream member and the film and a relatively low coefficient of friction between the other member and the film. This is most easily done by making both members nonrotatable and nonmoving, and making the upstream member or members smooth and the down-stream member rough. The stretching takes place after engagement with the rough guide member, so that any scratches made in the web by this member will largely be eliminated by the subsequent stretching.

It is also possible according to this invention for movement of the film to be impeded by making the downstream member rotatable and limiting its rotation rate to a peripheral speed generally equal to the relatively low speed. In fact both members can be rollers whose speed is thus limited.

The apparatus according to this invention therefore comprises a heating chamber having an inlet and an outlet, an upstream guide member and a downstream guide member in the chamber, and a combined brake and drive for introducing the film through the inlet into the chamber at a relatively low inlet speed and for withdrawing it from the chamber through the outlet at a relatively high outlet speed and for passing it in the chamber along a path passing over the upstream and downstream members. An external blower-type heater or internal infrared heaters heat the film in the chamber to a temperature generally above the softening point of the film. The upstream member permits the film to pass with a relatively low coefficient of friction and the downstream member inhibits movement of the film at a speed substantially greater than the low input speed. Thus the film will not stretch upstream of the downstream member.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

DESCRIPTION OF THE PREFERRED EMBODIMENTS

Figure 1:
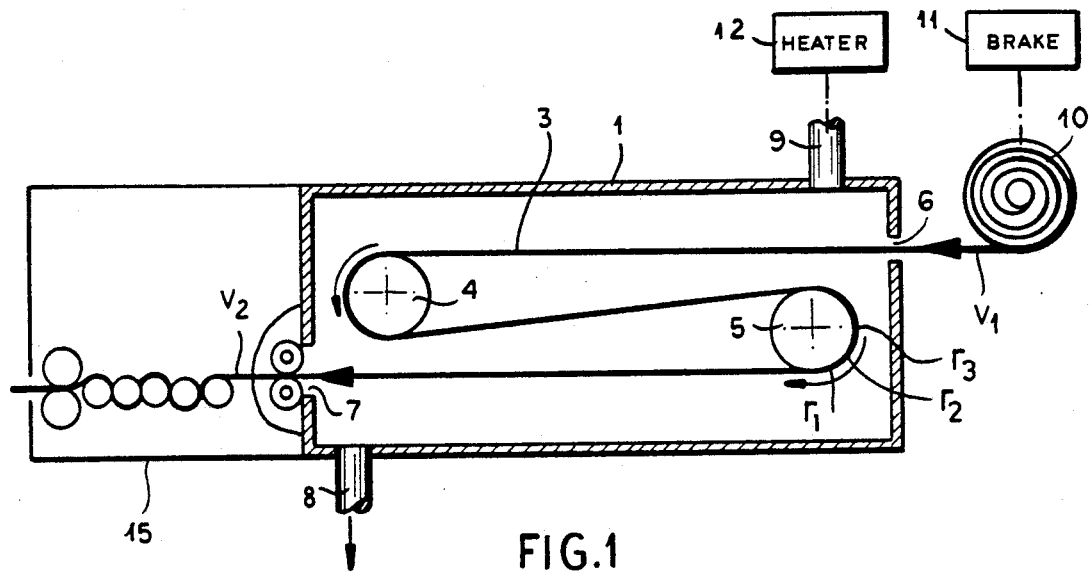
FIG. 1 is a mainly diagrammatic side view of an apparatus for carrying out the method of this invention.

As seen in FIG. 1 a thermoplastic film 3 is drawn off a coil 10 provided with a brake 11 and is fed at a constant and relatively low velocity $V_1$, here 25 m/min, through a port 6 into a heating chamber 1. Hot air is fed via a port 9 from a heater 12 into this chamber 1 and is extracted through a port 8 to maintain it generally at 150° C. Inside the chamber 1 the film 3 first passes over a smooth and stationary rod or member 4 and then over a rough-surfaced cylinder or member 5. Both the members 4 and 5 are stationary and are constructed such that the coefficient of friction between the member 4 and the film 3 is nominal and that between the member 5 and the film 3 is much greater, an effect most easily achieved by making the surface of the rod 4 smooth and that of the cylinder 5 rough. The film 3 is pulled out of the chamber at a relatively high speed $V_2$, here 200 m/min, through an outlet port 7 by a stretching apparatus 15 which may be of the type described in U.S. Pat. No. 3,351,697 of Hufnagel. The difference between the speeds $V_1$ and $V_2$ produces considerable tension in the film.

Inside the chamber the film 3 is heated by the time it reaches the high-friction member 5 sufficiently that it can be stretched. The tension in the film 3 created by the difference between the high exit speed $V_2$ and the low entry speed $V_1$ is not sufficient to overcome the friction between the film 3 and the member 5 so that the stretch point, that is the location where the film 3 starts to plastically deform, lies on this member 5 and never upstream of it. According to this invention the stretch point lies at one of several locations $r_1$, $r_2$, or $r_3$ depending on the temperature in the chamber and the rheology of the film 3, the point moving upstream toward location $r_3$ with increased temperature and/or decreased softening point of the film 3.

Figure 2:
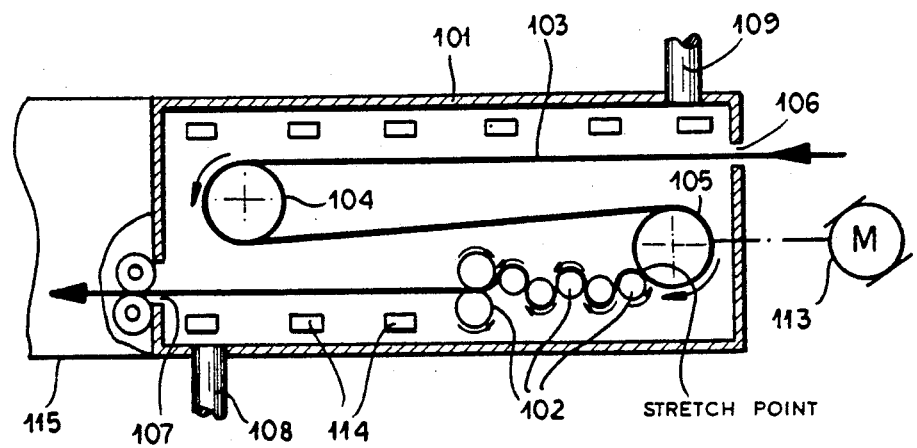
FIG. 2 is a diagrammatic view like FIG. 1 showing another apparatus according to this invention.

It is also possible as shown in FIG. 2, where functionally identical structure bears the same reference numerals as in FIG. 1 but augmented by 100, to provide a series of stretching rollers 102 right in the chamber 101, and to use infrared heaters 114 in addition to or instead of the heater 12. In addition in this arrangement the roller 104 is rotatable and is either driven to rotate at a peripheral speed equal to $V_1$, or is simply entrained by the film 3 to rotate at this speed. In addition the roller 105 is similarly rotatable but is connected to a drive 113 to rotate at a low speed, preferably a peripheral speed also equal to $V_1$.

In both arrangements the engagement of the film 3 with the downstream member 5 or 105 is such that any stretching beyond some minor elastic deformation is impossible upstream of the member 5 or 105. All stretching takes place downstream of this heating zone, starting from a neck or stretch point at $r_1$, $r_2$, or $r_3$ on the member 5 or 105, so that the stretching is exactly controlled. Thus the film 3 is not stretched until it is completely and homogeneously heated to the desired temperature to ensure a perfectly uniform end product. In addition the stretching takes place over a specific length of the film between the stretch point on the downstream member 5 or 105 and the intake of the stretching device 15 or 115.

I claim:

1. A method of stretching a thermoplastic film, the method comprising the steps of:
   passing the film through a heating chamber along a nonstraight path from an inlet to an outlet over a plurality of guide members including a rotatable upstream member and a rotatable downstream member;
   heating the interior of the chamber and the film therein to a temperature generally in excess of the softening point of the film;
   maintaining the travel speed of the film into the inlet at an input speed;
   pulling the film from the downstream member at an output speed substantially greater than the input speed; and
   impeding movement of the film upstream of the downstream member to a speed not generally exceeding the input speed by limiting rotation of the downstream member to a peripheral speed at most equal to the input speed, whereby the film is stretched substantially only at and downstream of the downstream member; and passing the downstream stretch of the web alternately over and under a multiplicity of stretching rollers in the chamber downstream of the second member.

2. An apparatus for stretching a thermoplastic film, the apparatus comprising:
   a heating chamber having an inlet and an outlet;
   a rotatable upstream guide and a rotatable downstream guide member in the chamber;
   means for introducing the film through the inlet into the chamber at an inlet speed
   means including a multiplicity of stretching rollers in the chamber downstream of the second member for withdrawing the film from the chamber through the outlet at an outlet speed substantially higher than the input speed and for passing it in the chamber along a path passing over the upstream and downstream members;
   means for heating the film in the chamber to a temperature generally above the softening point of the film;
   means associated with the upstream member for permitting the film to pass thereover with substantially no friction; and
   means associated with the downstream member for inhibiting rotation of same to a peripheral speed less than the input speed and for thereby inhibiting movement of the film thereover at a speed substantially greater than the input speed, whereby the film will not stretch upstream of the downstream member.

* * * * *